(12) United States Patent
Raghuchandra et al.

(10) Patent No.: US 12,155,340 B2
(45) Date of Patent: Nov. 26, 2024

(54) HYBRID POWER PLANT OPTIMIZATION FOR INCLEMENT WEATHER

(71) Applicant: VESTAS WIND SYSTEMS A/S, Aarhus N (DK)

(72) Inventors: Karthikeya Balladi Raghuchandra, Aarhus N (DK); Loránd Demsa, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 351 days.

(21) Appl. No.: 17/417,090

(22) PCT Filed: Dec. 17, 2019

(86) PCT No.: PCT/DK2019/050401
§ 371 (c)(1),
(2) Date: Jun. 21, 2021

(87) PCT Pub. No.: WO2020/125898
PCT Pub. Date: Jun. 25, 2020

(65) Prior Publication Data
US 2022/0077813 A1    Mar. 10, 2022

(30) Foreign Application Priority Data
Dec. 21, 2018    (DK) .......................... PA 2018 70851

(51) Int. Cl.
*H02S 20/32*    (2014.01)
*H02S 10/12*    (2014.01)
*F03D 1/00*    (2006.01)

(52) U.S. Cl.
CPC .............. *H02S 10/12* (2014.12); *H02S 20/32* (2014.12); *F03D 1/00* (2013.01);
(Continued)

(58) Field of Classification Search
CPC ......... H02S 10/12; H02S 20/32; Y02E 10/50; F03D 1/00; F05B 2220/708;
(Continued)

(56) References Cited

U.S. PATENT DOCUMENTS

2002/0067274 A1* 6/2002 Haller ..................... F03D 80/00
340/601
2003/0062037 A1 4/2003 Hayden et al.
(Continued)

FOREIGN PATENT DOCUMENTS

CN    203691324 U    7/2014
CN    107070371 A    8/2017
(Continued)

OTHER PUBLICATIONS

Danish Patent and Trademark Office 1st Technical Examination for Application No. PA 2018 70851 dated Jul. 4, 2019.
(Continued)

*Primary Examiner* — Michael Y Sun
(74) *Attorney, Agent, or Firm* — Patterson + Sheridan, LLP

(57) ABSTRACT

Embodiments herein describe optimizations for hybrid power plants that include wind turbine generators and photovoltaic generators by determining solar tracking setpoints for a field of photovoltaic generators co-located with a wind turbine generator, wherein the solar tracking setpoints orient a collector face for each photovoltaic generator sunward; in response to determining based on data received from the wind turbine generator that an airborne impactor event is occurring, adjusting the solar tracking setpoints to reposition the collector face out of a trajectory for airborne impactors; and transmitting the setpoints to tracking motors for the photovoltaic generators of the field.

13 Claims, 11 Drawing Sheets

(52) U.S. Cl.
CPC ..... *F05B 2220/708* (2013.01); *F05B 2240/96* (2013.01); *F05B 2260/8211* (2013.01); *F05B 2270/1016* (2013.01); *F05B 2270/80* (2013.01)

(58) Field of Classification Search
CPC .......... F05B 2240/96; F05B 2260/8211; F05B 2270/1016; F05B 2270/80
See application file for complete search history.

(56) References Cited

U.S. PATENT DOCUMENTS

| | | | |
|---|---|---|---|
| 2009/0076661 A1* | 3/2009 | Pearson | H01M 8/0494 |
| | | | 307/46 |
| 2009/0314325 A1 | 12/2009 | Borton | |
| 2010/0119370 A1* | 5/2010 | Myhr | F03D 80/40 |
| | | | 416/169 R |
| 2014/0261637 A1 | 9/2014 | Okandan et al. | |
| 2018/0023547 A1 | 1/2018 | Jeffus | |
| 2018/0112649 A1 | 4/2018 | Shain et al. | |
| 2018/0212559 A1 | 7/2018 | Meller et al. | |

FOREIGN PATENT DOCUMENTS

| | | |
|---|---|---|
| DE | 202012011485 U1 | 1/2013 |
| WO | 2009132603 A1 | 11/2009 |
| WO | 2010103378 A1 | 9/2010 |
| WO | 2020125898 A1 | 6/2020 |

OTHER PUBLICATIONS

PCT Notification of Transmittal of the International Search Report and the Written Opinion of the International Searching Authority, or the Declaration for Application No. PCT/DK2019/050401 dated May 3, 2020.

* cited by examiner

HYBRID POWER PLANT OPTIMIZATION FOR INCLEMENT WEATHER

BACKGROUND

Field

The present disclosure generally relates to the control of hybrid power plants that include one or more wind turbine generators and one or more other power generators.

Description of the Related Art

In power plants that generate electricity from renewable sources, such as wind (e.g., via wind turbine generators) or solar (e.g., via photovoltaic generators), inclement weather provides operational challenges. For example, a wind turbine generator uses a rotor including one or more blades to convert the kinetic energy of the wind into electrical energy, but the accumulation of ice on the blades tends to reduce the power production of the wind turbine generator for given wind conditions and increases the risk of an imbalance between the blades capable of damaging the wind turbine generator. In another example, a photovoltaic generator angles a solar panel to receive sunlight to produce electricity via the photovoltaic effect in a semiconductor medium, but the particular angle of the solar panel may increase the risk of an impactor (e.g., hail, ice, ash, debris) striking the solar panel or accumulating on the solar panel over time, and thereby reducing the efficiency of the photovoltaic generator.

SUMMARY

According to a first aspect of the present invention there is provided a method comprising: determining solar tracking setpoints for a field of photovoltaic generators co-located with a wind turbine generator, wherein the solar tracking setpoints orient a collector face for each photovoltaic generator sunward; in response to determining based on data received from the wind turbine generator that an airborne impactor event is occurring, adjusting the solar tracking setpoints to reposition the collector face at least partly out of a trajectory for airborne impactors; and transmitting the setpoints to tracking motors for the photovoltaic generators of the field.

The solar tracking setpoints may be adjusted to a predefined position.

The airborne impactor event may be determined based on detection of conditions conducive to, or indicative of, ice formation on the wind turbine generator.

The airborne impactor event may be determined based on data received from at least one hail detector mounted on a nacelle of the Wind Turbine Generator.

A Wind Turbine Generator Controller associated with the Wind Turbine Generator may, in response to determining that the airborne impactor event is occurring, feed forward determinations from the hail detector related to the airborne impactors to a field controller associated with the field of Photovoltaic Generators to thereby adjust the solar tracking setpoints.

A power plant controller associated with the wind turbine generator and the field of photovoltaic generators may, in response to determining that the airborne impactor event is occurring, feed forward determinations from the hail detector related to the airborne impactors to a field controller associated with the field of photovoltaic generators to thereby adjust the solar tracking setpoints.

The hail detector may feed forward determinations related to the airborne impactors directly to a field controller associated with the field of photovoltaic generators to thereby adjust the solar tracking setpoints.

The method may further comprise: identifying a given photovoltaic generator located along the trajectory for a potential airborne impactor from the wind turbine generator. The method may further comprise determining if the given photovoltaic generator includes an associated collector face that is repositionable relative to the trajectory. The method may further comprise determining an optimized setpoint for the given photovoltaic generator that reorients the associated collector face to reduce an expected impact force of the potential airborne impactor to the associated collector face; and positioning the given photovoltaic generator according to the optimized setpoint.

The method may further comprise: determining a mitigation setpoint for the photovoltaic generator that orients a rear face of the photovoltaic generator opposite to the collector face into the trajectory. The method may further comprise determining an avoidance setpoint for the wind turbine generator that repositions a throw zone to not overlay the given photovoltaic generator, so that the given photovoltaic generator is no longer in the trajectory. The method may further comprise determining whether a first reduction in power output from the given photovoltaic generator at the mitigation setpoint relative to a sun tracking setpoint is greater than a second reduction in power output from the wind turbine generator at the avoidance setpoint relative to a wind tracking setpoint; in response to determining that the first reduction in power is greater than the second reduction in power: setting the optimized setpoint to the sun tracking setpoint; and positioning the wind turbine generator according to the avoidance setpoint.

Other photovoltaic generators in the field that are not in the thrown zone may not be positioned according to the optimized setpoint.

The optimized setpoint may be determined based on a force and power generation curve such that an expected power generation of the field of photovoltaic generators is maximized when the collector faces are repositioned to reduce the expected force of the potential airborne impactor below an impact threshold.

The photovoltaic generators comprising the field of photovoltaic generators may be positionable on one of one axis or two axes.

According to a second aspect of the present invention there is provided a control system comprising one or more controller units configured to implement any of the features or aspects described herein.

The controller units may be any one or more of a Wind Turbine Generator Controller, a Field Controller, and a Power Plant Controller, or any combination thereof.

According to a third aspect of the present invention there is provided a hybrid power plant that comprises the control system described herein.

In a further aspect of the present invention there is provided a hybrid power plant, comprising: a field of photovoltaic generators; a wind turbine generator co-located with the field of photovoltaic generators such that a throw zone of the wind turbine generator is positionable to overlay at least one photovoltaic generator of the plurality of photovoltaic generators; and a controller unit configured to: determine solar tracking setpoints for the field of photovoltaic generators, wherein the solar tracking setpoints orient a collector face for each photovoltaic generator sunward; in response to determining that the wind turbine generator is capable of dislodging airborne impactors along a trajectory towards at least one photovoltaic generator, adjust the solar tracking setpoints to reposition the collector face out of the trajectory for the airborne impactors; and transmit the setpoints to tracking motors for the photovoltaic generators of the field.

In a further aspect of the present invention there is provided a controller unit, comprising: a processor; and a memory, including instructions that when performed by the processor cause the controller unit to: determine solar tracking setpoints for a field of photovoltaic generators co-located with a wind turbine generator, wherein the solar tracking setpoints orient a collector face for each photovoltaic generator sunward; in response to determining that the wind turbine generator is capable of dislodging airborne impactors along a trajectory towards at least one photovoltaic generator, adjust the solar tracking setpoints to reposition the collector face out of the trajectory for the airborne impactors; and transmit the setpoints to tracking motors for the photovoltaic generators of the field.

The features described above or below may apply to or be combined with any aspect of the present invention.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure provides strategies for power output optimization from a hybrid solar/wind power plant during inclement weather, which may be embodied in systems, methods, and computer program products. The discussed optimization strategies may be implemented at one or more of the Wind Turbine Generators (WTG), Photovoltaic (PV) field controllers, or a Power Plant Controller (PPC).

Figure 1:
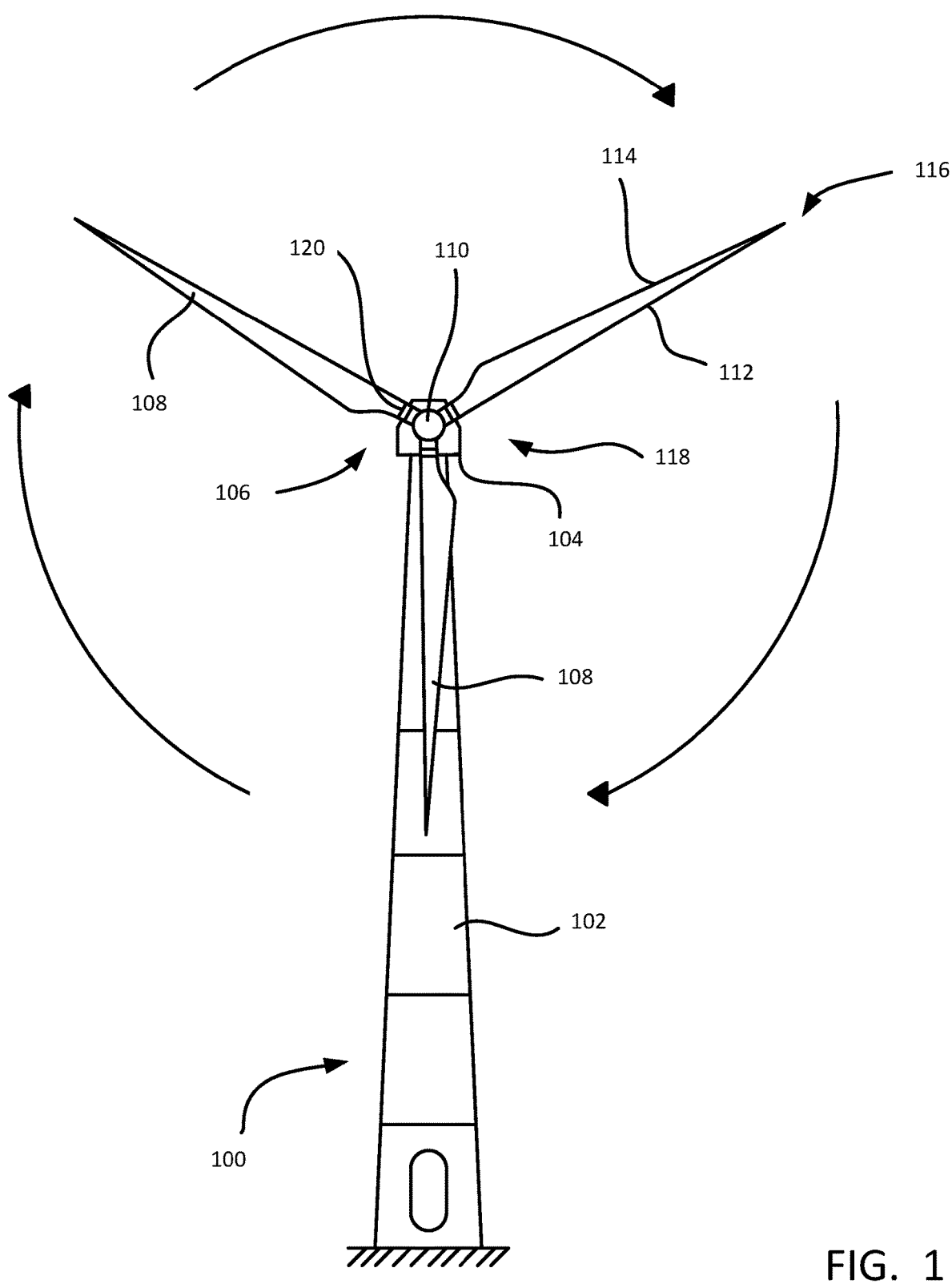
FIG. 1 illustrates a diagrammatic view of an exemplary wind turbine generator, according to one or more embodiments of the present invention.

FIG. 1 illustrates a diagrammatic view of an exemplary WTG 100. Although the WTG 100 is illustrated as a horizontal-axis wind turbine, the principles and techniques described herein may be applied to other wind turbine implementations, such as vertical-axis wind turbines. The WTG 100 typically comprises a tower 102 and a nacelle 104 located at the top of the tower 102. A rotor 106 may be connected with the nacelle 104 through a low-speed shaft extending out of the nacelle 104. As shown, the rotor 106 comprises three rotor blades 108 mounted on a common hub 110 which rotate in a rotor plane, but the rotor 106 may comprise any suitable number of blades 108, such as one, two, four, five, or more blades 108. The blades 108 (or airfoil(s)) typically each have an aerodynamic shape with a leading edge 112 for facing into the wind, a trailing edge 114 at the opposite end of a chord for the blades 108, a tip 116, and a root 118 for attaching to the hub 110 in any suitable manner.

For some embodiments, the blades 108 may be connected to the hub 110 using pitch bearings 120, such that each blade 108 may be rotated around a respective longitudinal axis to adjust the blade's pitch. The pitch angle of a blade 108 relative to the rotor plane may be controlled by linear actuators, hydraulic actuators, or stepper motors, for example, connected between the hub 110 and the blades 108.

Figure 2:
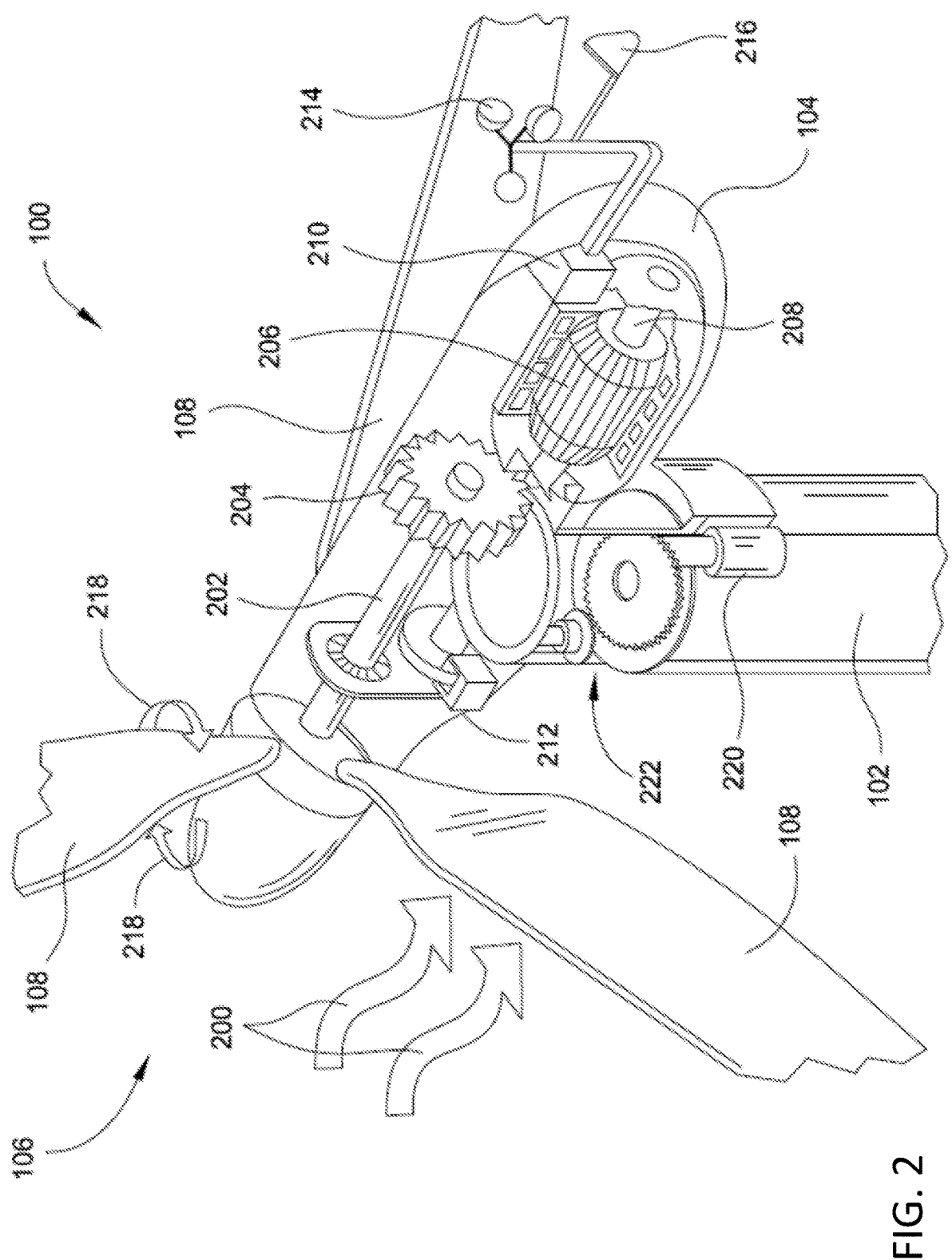
FIG. 2 illustrates a diagrammatic view of typical components internal to a wind turbine generator, according to one or more embodiments of the present invention.

FIG. 2 illustrates a diagrammatic view of typical components internal to the nacelle 104 and tower 102 of the WTG 100. When the wind 200 is incident on the blades 108, the rotor 106 rotates and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206.

A controller 210 may sense the rotational speed of one or both of the low-speed shaft 202 and the high-speed shaft 208. If the controller 210 determines that the shaft(s) are rotating too fast, the controller 210 may pitch the blades out of the wind or by increasing the torque form the generator 206 which slows the rotation of the rotor 106—i.e., reduces the revolutions per minute (RPM). A braking system 212 may prevent damage to the components of the WTG 100 by keeping the hub 110 from rotating when the hub is already at, or very close, to standstill. The controller 210 may also receive inputs from an anemometer 214 (providing wind speed) and/or a wind vane 216 (providing wind direction). Based on information received, the controller 210 may send a control signal to one or more of the blades 108 to adjust the pitch 218 of the blades 108. By adjusting the pitch 218 of the blades 108, the rotational speed of the rotor 106 (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3A:
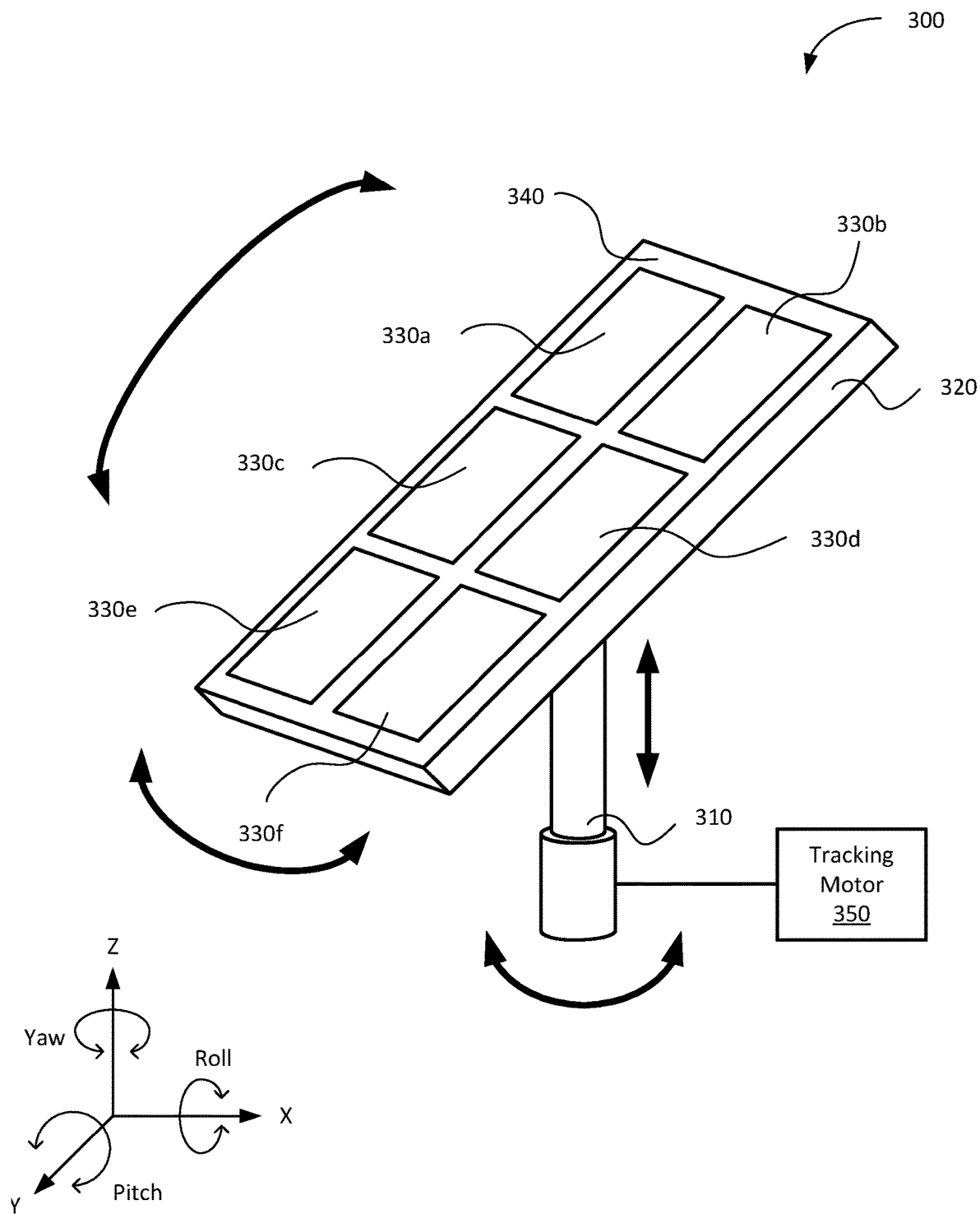
FIGS. 3A-3C illustrate a diagrammatic view of an exemplary photovoltaic generator, according to one or more embodiments of the present invention.
Figure 3B:
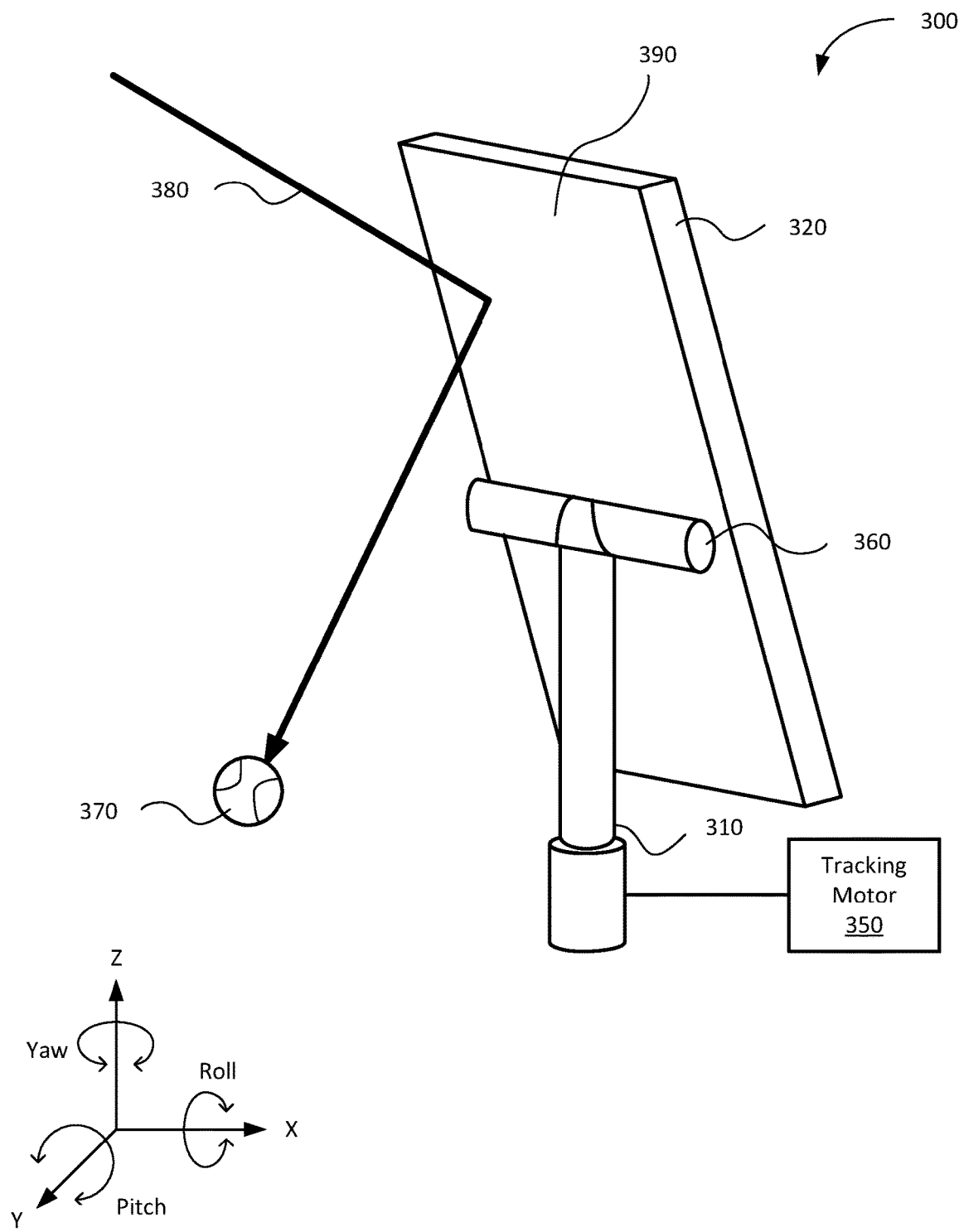
Figure 3C:
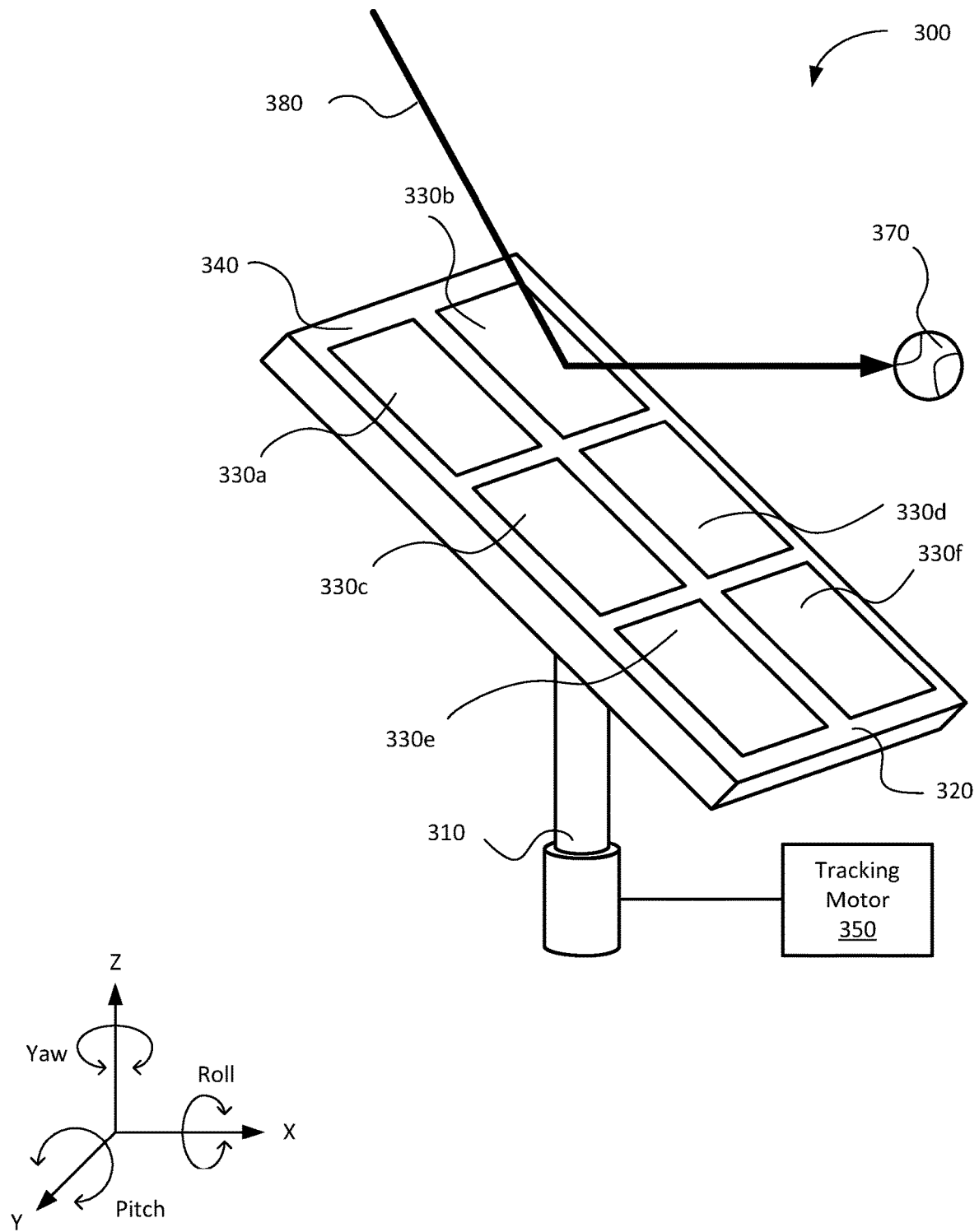

FIGS. 3A-3C illustrate diagrammatic views of an exemplary Photovoltaic Generator (PVG) 300 (Photovoltaic Generator), according to embodiments of the present disclosure. The PVG 300 includes a base 310 that positions a solar panel 320 away from the ground or other mounting surface. As shown in FIG. 3A, the solar panel 320 includes six rectangular solar cells 330a-e (generally, solar cells 330) defined on a collector face 340 in a rectangular arrangement. The collector face 340 is depicted as being substantially planar, but other configurations of the collector face 340 are also possible. Further, the solar panel 320 may include any suitable alternate number of solar cells 330, such as one, two, three, four, five, or more solar cells 330 of various shapes (e.g., hexagonal, circular, triangular) in various arrangements, whether repeating or non-repeating.

The solar cells 330 generate electricity from incident light, either on one side of the surface or both sides, via the photovoltaic effect. In some embodiments, the solar cells 330 absorb the incident light, which excites a charge carrier in a material matrix of the solar cell 330 to a higher energy state to thereby produce a voltage differential and thereby electricity.

A tracking motor 350 is provided to adjust how the collector face 340 is oriented relative to the Sun and other objects in the environment. In various embodiments, the tracking motor 350 adjusts the plane in which the collector face 340 is oriented by one or more of: raising/lowering the solar cell 330 relative to the mounting surface, and yawing, pitching, or rolling the collector face 340 on one or more axes of rotation. In some embodiments, the position of the PVG 300 is statically fixed, and the tracking motor 350 may be omitted. The tracking motor 350 adjusts the plane in which the collector face 340 is oriented relative to the Sun according to various setpoints. In several embodiments, the setpoints change over the course of the day so that the tracking motor 350 causes the collector face 340 to track the Sun in the sky and present as much surface area of the collector face 340 as possible free of shadows and perpendicular to the Sun to thereby optimize the surface area available to collect light.

FIG. 3B illustrates a second view of the PVG 300 in which a rear face 390 of the solar panel 320 is visible. Unlike the collector face 340, which opposes the rear face 390, the rear face 390 lacks solar cells 330. Instead, the rear face 390 may include various actuators, hydraulics, joints, and other control features 360 that the tracking motor 350 uses to impart orientation to the solar panel 320 according to the setpoints. The rear face 390, due to the lack of solar cells 330 thereon, is less susceptible to damage from impactors 370 striking the rear face 390 than the collector face 340. Further, some or all of the rear face 390 may be constructed of materials that are more resilient than those of the collector face 340.

As illustrated in FIG. 3B, the impactor 370 is a ball following an initial trajectory 380 and bouncing off of the rear face 390. In various embodiments, the setpoints applied to the PVG 300 position the rear face 390 to receive impactors 370 to prevent or lower the chances of the impactors 370 striking the collector face 340. In other embodiments, the setpoints applied to the PVG 300 position the collector face 340 to optimize the amount of sunlight collected by the solar cells 330 while reducing the expected force of impactors 370 striking the collector face 340.

For example, FIG. 3C illustrates the collector face 340 positioned relative to the trajectory 380 to reduce the force imparted by the impactor 370 to the solar cells 330 in the event that the impactor 370 strikes the collector face 340. In various embodiments, the tracking motor 350 may be unable to position the rear face 390 to deflect the impactors 370 (e.g., in a fixed-axis or a single-axis adjustable PVG 300), or the expected force of the impactors 370 falls below an impact threshold that the solar cells 330 can receive the imparted force without sustaining damage. In such embodiments, the tracking motor 350 positions the collector face 340 at an oblique or parallel angle relative to the trajectory 380 so that if the impactor 370 does strike the collector face 340, less kinetic energy is transferred from the impactor 370 to the PVG 300 than if the impactor 370 were to directly strike the collector face 340 (e.g., when the trajectory is perpendicular to the collector face 340). In some embodiments, the tracking motor 350 moves the collector face 340 to an optimized position that ensures that the expected force imparted by potential impactors 370 falls below the impact threshold for the solar cells 330 (or a safety margin thereof), but otherwise maximizes the amount of sunlight collected by the solar cells 330 operating in a weather event that produces airborne impactors 370.

Although the impactors 370 are illustrated as a ball in FIG. 3B and FIG. 3C, impactors 370 may also include ice (including hailstones and ice dislodged from structures above the PVG 300), volcanic ash, blown sand, blown leaves/branches, and other debris capable of striking the PVG 300.

Figure 4:
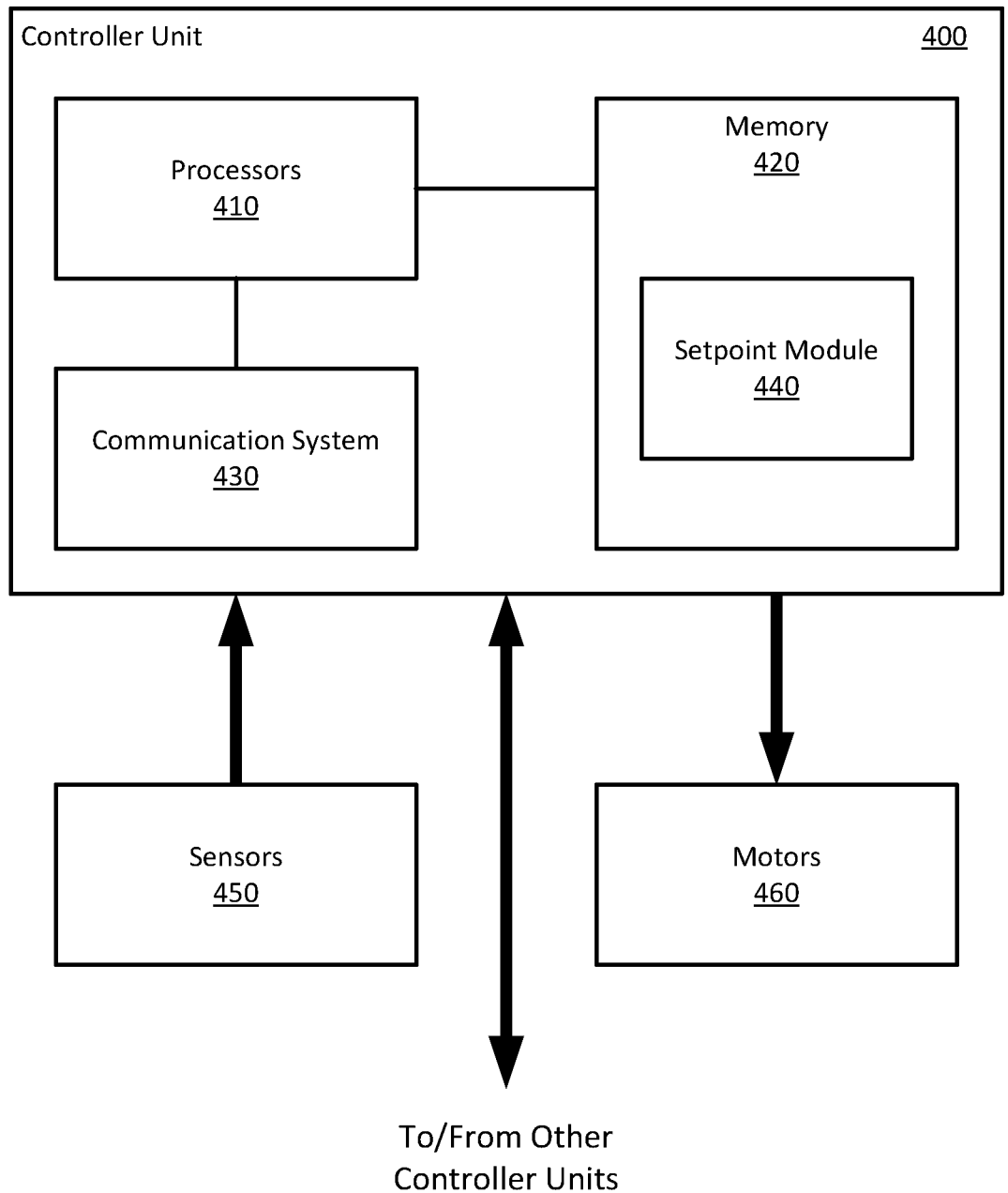
FIG. 4 is a block diagram of a controller unit as may be used as a generator controller or a power plant controller, according to one or more embodiments of the present invention.

FIG. 4 is a block diagram of a controller unit 400 as may be used in one or more of a WTG 100, a PVG 300 (for one or more PVGs 300), or PPC to control several generator units in a power plant, according to one or more embodiments. The controller unit 400 includes one or more computer processors 410 and a memory 420. The one or more processors 410 represent any number of processing elements that each can include any number of processing cores. The memory 420 can include volatile memory elements (such as random access memory), non-volatile memory elements (such as solid-state, magnetic, optical, or Flash-based storage), and combinations thereof. Moreover, the memory 420 can be distributed across different mediums (e.g., network storage or external hard drives).

As shown, the one or more processors 410 are communicatively coupled with a communication system 430 to send/receive communication via fiber optic cables, electrical wires, and/or radio signals with various sensors 450, motors 460, and other controller units 400. In some embodiments, the various sensors 450 and motors 460 are linked to the generator units under the control of the controller unit 400. In other embodiments, the various sensors 450 are independent from the generator units under the control of the controller unit 400. For example, a controller unit 400 in control of several PVGs 300 may send setpoints to the various motors 460 of those PVGs 300 (e.g., a tracking motor 350) and receive sensor data from various light level, voltage/current level, temperature, and positional sensors associated with those PVGs 300, but may also receive sensor data from sensors 450 associated with WTGs 100 and other PVGs 300 not under the control of the controller unit 400 and sensors not associated with a generator unit.

The memory 420 may include a plurality of "modules" for performing various functions described herein. In one embodiment, each module includes program code that is executable by one or more of the processors 410. However, other embodiments may include modules that are partially or fully implemented in hardware (i.e., circuitry) or firmware. The memory 420 includes a setpoint module 440 that enables the controller unit 400 to optimize the setpoints at which the various generator units in communication with the controller unit 400 operate during inclement weather as described in the present disclosure. In some embodiments, the setpoint module 440 is preloaded with setpoints for the associated generator units (i.e., WTGs 100 and PVGs 300) to use in response to determining that one or more PVGs 300 are at risk of being struck by potential debris dislodged from a WTG 100. In some embodiments, the setpoint module 440 calculates, based on data received from wind sensors, temperature sensors, and the weather sensors, setpoints for the generator units based on current weather conditions. For example, in response to detecting hailstones travelling west-to-east, the setpoint module 440 identifies setpoints that position the PVGs 300 to have the collector faces 340 oriented eastward (i.e., to position the rear face 390 to block the impactors 370), whereas in response to detecting hailstones travelling east-to-west, the setpoint module 440 positions the PVGs 300 to have the collector faces 340 oriented westward.

Figure 5:
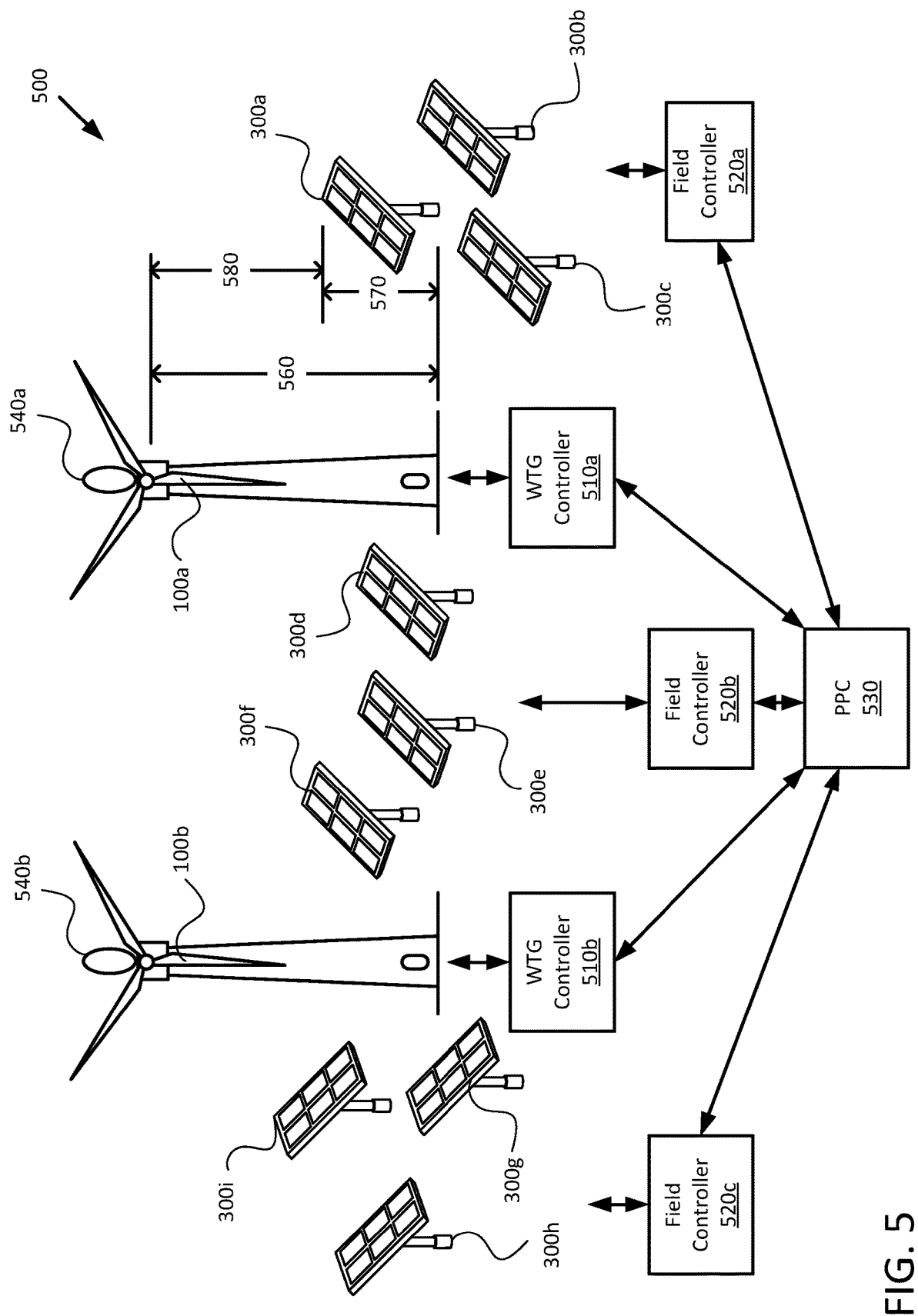
FIG. 5 is a diagrammatic view of an exemplary hybrid power plant and control system, according to one or more embodiments of the present invention.

FIG. 5 is a diagrammatic view of an exemplary hybrid power plant and control system 500, according to one or more embodiments of the present invention. The illustrated hybrid power plant 500 includes a first WTG 100a, a second WTG 100b, and nine PVGs 300a-i. As illustrated, the first WTG 100a is controlled by a first WTG controller 510a (generally, WTG controller 510) and the second WTG is controlled by a second WTG controller 510b. A first field controller 520a (generally, field controller 520) controls PVGs 300a-c, a second field controller 520b controls PVGs 300d-f, and a third field controller 520c controls PVGs 300g-i. Although two WTGs 100 and nine PVGs 300 (organized into three fields of three PVGs 300 each) are shown in FIG. 5, a hybrid power plant 500 may include more or fewer of each element and may be organized into different groupings than illustrated.

Each of the WTG controllers 510, field controllers 520, and PPC 530 are implementations of controller units 400 used to manage and control different portions of the hybrid power plant 500 and form the overall control system for the hybrid power plant. The WTG controllers 510 manage the setpoints of the associated WTGs 100; setting the angles of the nacelles 104 and blades 180, speeds of rotation, times of change, power output levels (e.g., active/reactive balance), whether supplemental systems such as deicing systems are active, etc. The field controllers 520 manage the setpoints of the associated PVGs 300, setting the heights and angles of the solar panels 320, and whether supplemental systems are active. In various embodiments, the PPC 530 manages the WTG controllers 510 and the field controllers 520 based on the power demand of an electrical grid, weather conditions, and user input. In some embodiments, the PPC 530 uses a Supervisory Control and Data Acquisition (SCADA) architecture to manage inputs received from the other various controllers, inputs from a grid operator or power plant manager, and data received from external sources (e.g., forecast data) and sensors associated with the power plant.

As illustrated in FIG. 5, the first WTG 100a includes a first hail sensor 540a (generally, hail sensor 540) and the second WTG 100b includes a second hail sensor 540b. The hail sensors 540 are installed atop the respective WTGs 100 at a first height 560 above the ground. In comparison, the PVGs 300 extend a second height 570 above the ground, and an inter-generator distance 580 is defined as the difference between the first height 560 and the second height 570. In embodiments in which the ground level is uneven, or the PVGs 300 are otherwise variable in height, the second height 570 may be calculated as the highest available height within a field of PVGs 300 or as an average height within a field of PVGs 300.

Using data collected from the hail sensors 540, the hybrid power plant 500 is able to detect inclement weather events that include or produce potential impactors 370. The inter-generator distance 580 allows sufficient time to react to the detection of impactors 370 and protect the PVGs 300 from the impactors. For example, the speed of a falling hailstone is typically between 9 meters per second (m/s) and 48 m/s (based at least in part on the diameter of the hailstone), and a hail sensor 540 located at a first height 560 of 90 m or more above the ground, such as atop a WTG 100, can provide roughly two seconds (or more) advance notice, during which the position of PVGs 300 may be adjusted to reorient the solar panels 320 to avoid or mitigate damage to the solar cells 330 from incoming airborne impactors 370. In various embodiments, the advance notice to adjust the position of a PVG 300 is referred to as an alert time, which indicates the time between detecting the airborne impactor 370 and when the airborne impactor 370 is calculated to reach the PVG 300.

Depending on the arrangement of the hybrid power plant 500 and the distances between the WTGs 100, PVGs 300, WTG controllers 510, the field controllers 520, and PPC 530, an operator may employ one of three control schemes to use the advance warning provided by the hail sensors 540 to protect the PVGs 300. In various embodiments, the hails sensors 540 may be augmented by or replaced with other types of sensors (e.g., LIDAR, thermometers, barometers) or advanced weather forecasting data.

In a first scheme, a WTG controller 510 receives the data from the hail sensor 540 associated with the WTG 100 and feeds forward the determinations related to airborne impactors 370 (e.g., size, speed, direction) to one or more of the field controllers 520 to protect the associated PVGs 300. Due to the proximity of the hail sensors 540 to the WTG controllers 510, the first scheme offers a faster response time for fields that are near the associated WTG 100, but comparatively further away from the PPC 530.

In a second scheme, a PPC 530 receives the data from one or more of the hail sensors 540 associated with the WTGs 100 and feeds forward the determinations related to airborne impactors 370 (e.g., size, speed, direction) to one or more of the field controllers 520 to protect the associated PVGs 300. Due to the PPC 530 receiving data from several WTG controllers 510, the second scheme offers advantages in hybrid power plants 500 that include relatively few WTGs 100 or hail sensors 540 (or relatively few WTGs 100 that are near the PVGs 300) or larger fields of PVGs 300. For example, a hybrid power plant 500 spread over a large area may use determinations from hail sensors 540 on a first side of the hybrid power plant 500 to provide additional time to reposition PVGs 300 on a second side of the hybrid power plant 500; potentially before hail sensors 540 on the second side detect airborne impactors 370.

In a third scheme, the hail sensors 540 feed the determinations related to airborne impactors 370 (e.g., size, speed, direction) directly to one or more of the field controllers 520 to protect the associated PVGs 300. In some embodiments, one field controller 520 receives inputs from multiple hail sensors 540, and weights the determinations of related to the airborne impactors 370 based on a proximity of each hail sensor 540 to the field of PVGs 300 associated with the field controller 520. For example, a first field controller 520a that receives sensor data from a first hail sensor 540a and a second hail sensor 520b that is further from the field of PVGs 300 than the first hail sensor 540a (as shown in FIG. 5) places greater emphasis on the data from the first hail sensor 540a. In contrast, a second field controller 520b that receives sensor data from a first hail sensor 540a and a second hail sensor 540b that are substantially equidistant from the field of PVGs 300 (as shown in FIG. 5) places equal emphasis on the data from the first hail sensor 540a and the second hail sensor 540b.

In various embodiments, a hybrid power plant 500 employs one or more than one of the control schemes outlined herein for different sectors of the hybrid power plant 500 depending on the number and layout of the generating units in the hybrid power plant 500.

Figure 6A:
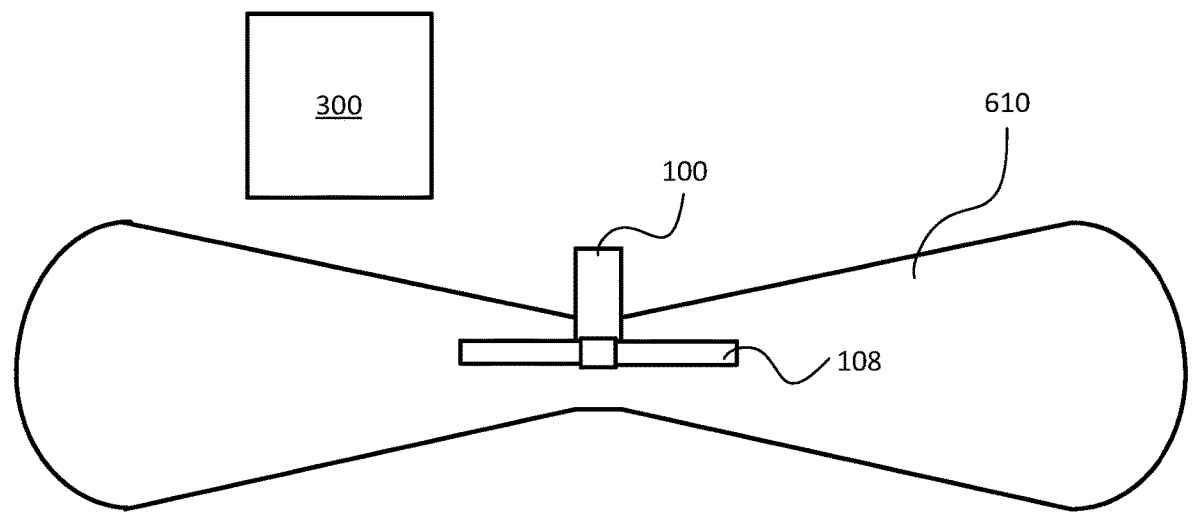
FIGS. 6A and 6B provide visualizations for a throw zone for a wind turbine generator, according to one or more embodiments of the present invention.
Figure 6B:
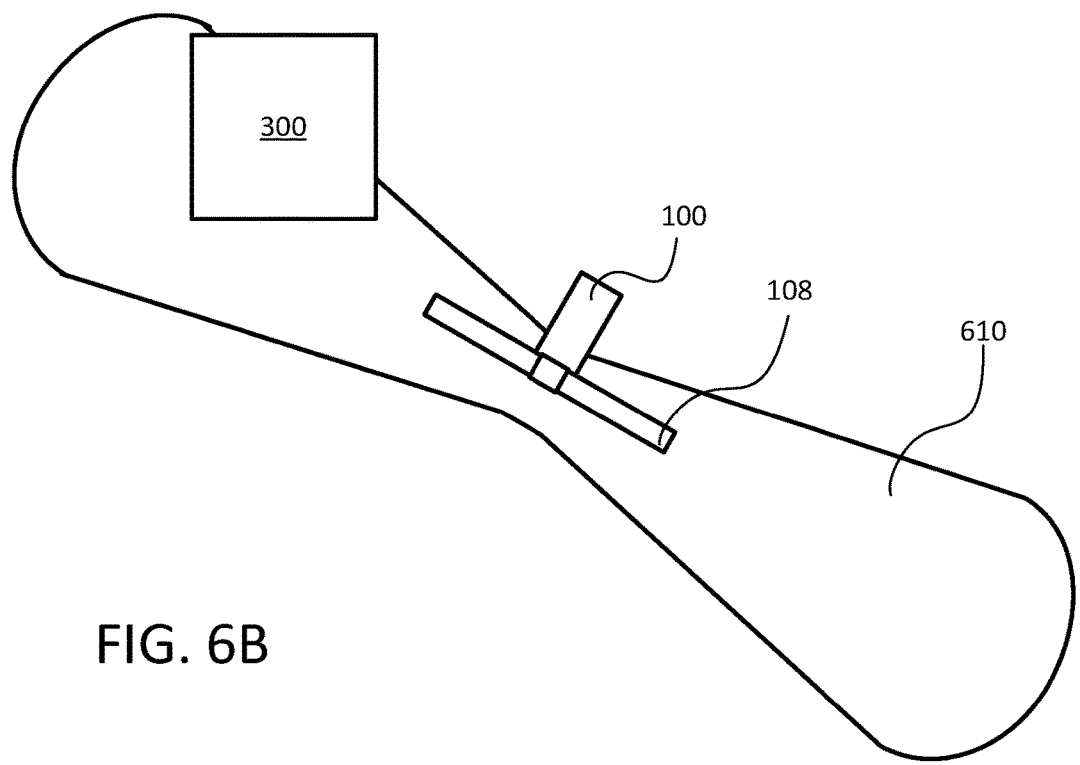

FIGS. 6A and 6B provide visualizations for a throw zone 610 for a WTG 100, according to embodiments of the present disclosure. As illustrated in FIGS. 6A and 6B, as the WTG 100 reorients relative to the wind to generate power, the throw zone 610 also reorients. In FIG. 6A, the throw zone 610 does not intersect a PVG 300, while in FIG. 6B, the throw zone 610 intersects a PVG 300 when the WTG 100 is reoriented.

A throw zone 610 defines a region in which ice or other debris that accumulates on the blades 108 and other surfaces of the WTG 100 or kinetically striking the WTG 100 (e.g., a blade 108 "batting" a hailstone) are expected to land when dislodged or ricocheting from the WTG 100. Any debris dislodged from the WTG 100 may take various trajectories away from the WTG 100. The distance that throw zone 610 extends from the WTG 100, and the area that the throw zone 610 covers varies based on the operating state of the WTG 100. For example, the maximum distance that debris may be thrown when the WTG 100 is operating may be greater than when the WTG 100 is idling or not operating. For example, the distance that dislodged debris may travel when the WTG 100 is operating may be defined according to Formula 1, while the distance that dislodged debris may travel when the WTG 100 is not operating may be defined according to Formula 2. In Formulas 1 and 2, d represents the maximum travel distance of debris, D the diameter of the rotor, H the height of the hub from which the blades 108 extend, and v the wind velocity at hub height.

$$d = 1.5 * (D + H) \quad \text{[Formula 1]}$$

$$d = v * (H + D/2)/15 \quad \text{[Formula 2]}$$

A throw zone 610 may be further divided into various regions based on the likelihood of the debris landing in that region or the expected impact force of dislodged debris on objects within that region, and the boundary defining the throw zone 610 may constitute a predefined probability that debris dislodged from the WTG 100 will fall within the throw zone 610 with an n % certainty. In FIGS. 6A and 6B, the throw zone 610 defines a region generally parallel to the blades 108, but the shape and size of the throw zone 610 may change based on wind speed, wind direction, debris size, turbine speed, and debris type.

Figure 7:
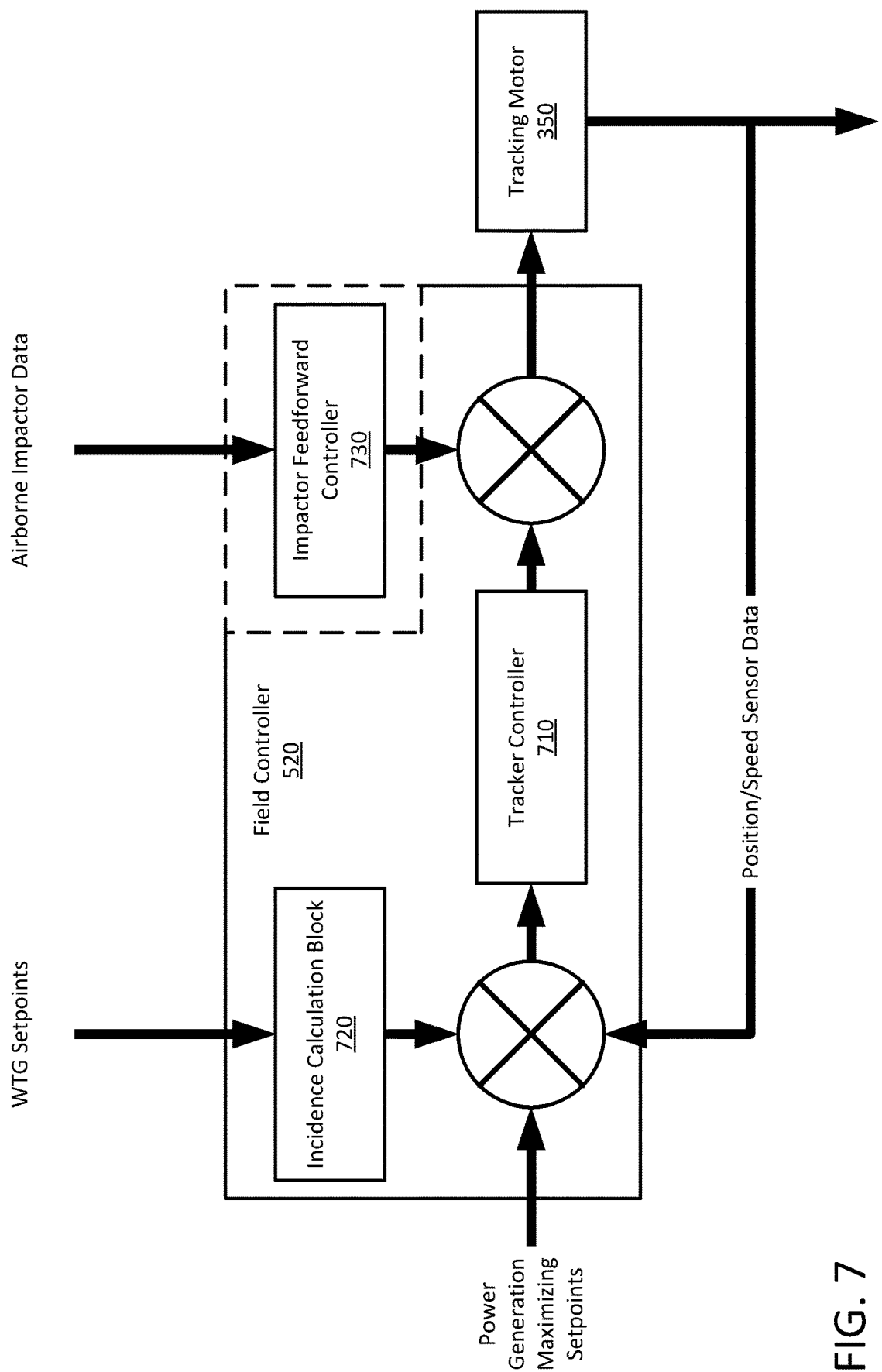
FIG. 7 is a logical schematic for a field controller for photovoltaic generators, according to one or more embodiments of the present invention.

FIG. 7 is a logical schematic for a field controller 520 for one or more PVGs 300, according to embodiments of the present disclosure. The field controller 520 uses data provided by one or more sensors or controllers to signal the tracking motor(s) 350 of associated PVGs 300 the setpoints for how the PVGs 300 are to be oriented in the environment. A tracker controller 710 receives tracking setpoints for optimizing the position of the PVGs 300 to collect sunlight at a given time of day/year to thereby generate as much power as possible for the given position of the Sun. In various embodiments, an incidence calculation block 720 and an impactor feedforward controller 730 affect the setpoints used for the PVGs 300 to protect the PVGs 300 from potentially damaging impactors during inclement weather while optimizing the power output of those PVGs 300 in light of the inclement weather.

The incidence calculation block 720 receives the setpoints from one or more WTGs 100 that have throw zones 610 that potentially overlap or intercept one or more PVGs 300 that the field controller 520 controls. Depending on the positions of the WTGs 100 relative to the PVGs 300, the angle/orientation/speed of the WTGs 100, and weather conditions, the calculation block 720 may have no output, or may produce setpoints that override the power generation maximizing setpoints generally used by the PVGs 300. During conditions in which debris may accumulate on the WTGs 100, the incidence calculation block 720 uses the setpoints of the WTGs 100 to determine setpoints for those PVGs 300 that mitigate the chance of damage to the PVGs 300 if debris were to be dislodged from those WTGs 100. For example, when ice accumulation is detected on the blades 108 of a WTG 100 and a deicing system is active (or the temperature/angular velocity is sufficient to dislodge the accumulated ice), the incidence calculation block 720 may override the power generation maximizing setpoints for the PVGs 300 with setpoints calculated to optimize the angle of incidence for the collector face 340 to avoid damage from the potential debris. For example, the collector face 340 of the PVGs 300 may be rotated away from the WTG 100, regardless of the position of the Sun, to present elements of the PVGs 300 that are stronger or more robust to impact than the solar cells 330 to the WTG 100 so that any potential debris from the WTG 100 does not damage the solar cells 330.

In some embodiments, the field controller 520 includes an impactor feedforward controller 730, while in other embodiments, the field controller 520 receives input from an impactor feedforward controller 730 implemented at a WTG controller 510 or a PPC 530. The impactor feedforward controller 730 receives airborne impactor data, such as from a hail sensor 540, and determines whether and how to adjust the setpoints of the PVGs 300 to collect sunlight during a weather event producing airborne impactors (e.g., hailstones, ash, flying branches). For example, when hail is detected by a hail sensor 540 atop a WTG 100, the impactor feedforward controller may adjust the control signals sent from the tracker controller 710 to the tracking motor 350 to optimize the angle of incidence for the collector face 340 to avoid damage from the detected impactors. For example, the collector face 340 of the PVGs 300 are rotated away from the direction of travel of hailstones present elements of the PVGs 300 that are stronger or more robust to impact than the solar cells 330 to the WTG 100 so that any airborne impactors do not damage the solar cells 330. In another example, the collector faces 340 of the PVGs 300 are angled such that any detector impactors do not accumulate on the solar cells 330; preserving the ability of the solar cells 330 to collect sunlight.

The tracking motor 350 provides feedback on the position imparted to the associated PVG 300 and the speed at which the PVG 300 is moving to the setpoints designated by the field controller 520. As conditions change, (e.g., ice is no longer detected on the WTG 100, hail has ceased, hail has changed in size/speed/intensity), the field controller 520 may adjust the current positions of the PVGs 300 accordingly.

Figure 8:
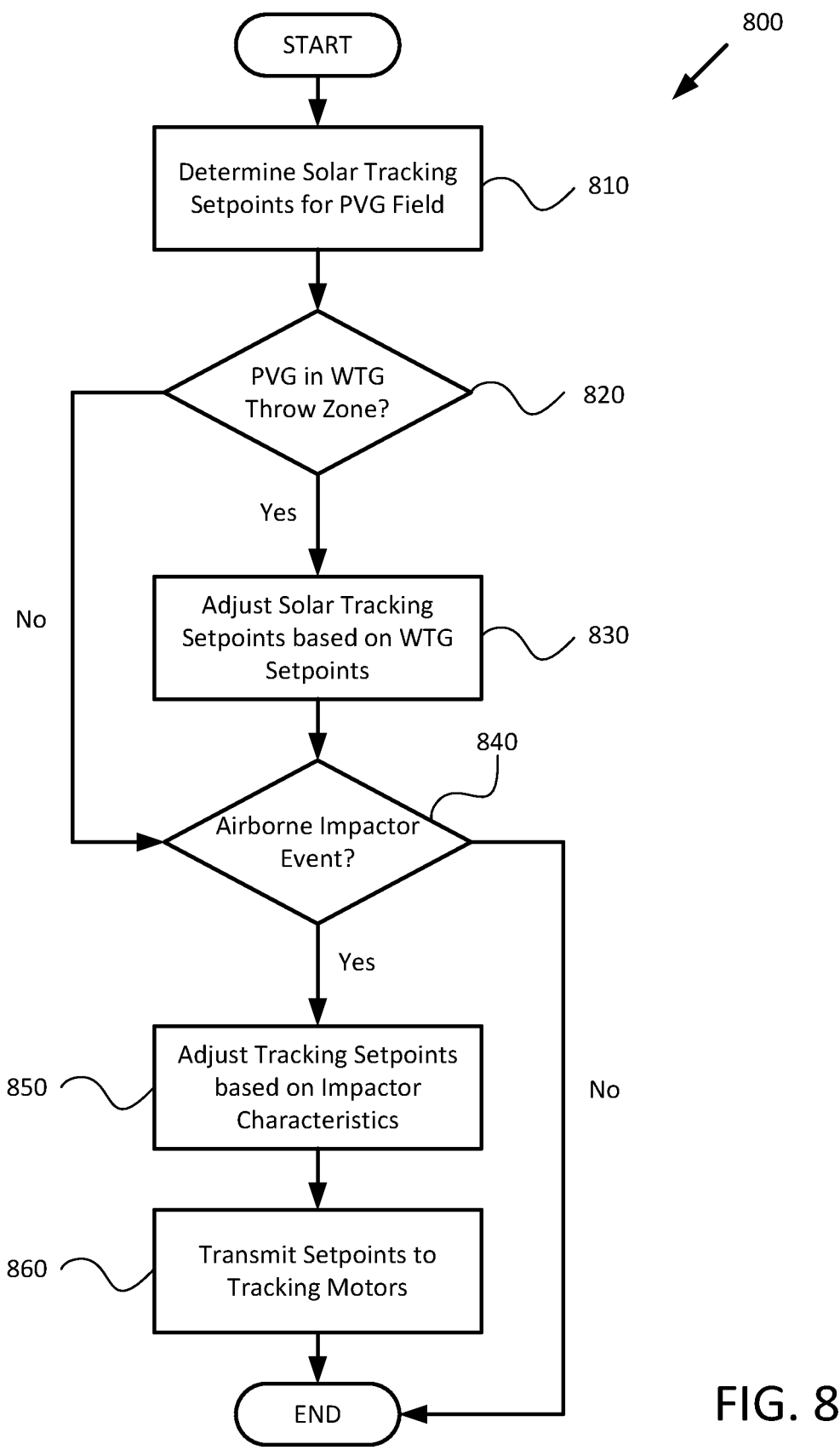
FIG. 8 is a flowchart of a method for adjusting photovoltaic setpoints for inclement weather events, according to one or more embodiments of the present invention.

FIG. 8 is a flowchart of a method 800 for adjusting photovoltaic setpoints for inclement weather events, according to embodiments of the present disclosure. Inclement weather events include conditions in which ice may form on WTGs 100 or airborne impactors (e.g., hailstones, volcanic ash, blown leaves/twigs/stalks) have been detected by various sensors. Method 800 beings at block 810, where field controller 520 for a field of PVGs 300 determines the solar tracking setpoints for that field of PVGs 300. In various embodiments, the solar tracking setpoints specify the angles at which the collector faces 340 of the PVGs 300 in a field are positioned at various times to face sunward and thereby track the Sun and produce the maximum potential power output for a given time during optimal conditions (e.g., not during inclement weather, cloud cover below a given threshold). In various embodiments, each PVG 300 in a particular field is set to the same angle as the other PVGs 300 in that field based on the solar tracking setpoints. In various embodiments, the solar tracking setpoints adjust the PVGs 300 to be perpendicular (or as perpendicular as possible for the degrees of freedom available to the PVGs 300) to rays of sunlight based on the position of the Sun in the sky at a particular time.

At block 820, the field controller 520 determines whether at least one PVG 300 in the associated field is within a throw zone 610 for at least one WTG 100. Method 800 proceeds to block 830 in response to determining that a PVGs 300 is within the throw zone 610, and to block 840 in response to determining that no PVGs 300 are within the throw zone 610. In various embodiments, the field controller 520 determines that no PVGs 300 are in the throw zone 610 until ice or other debris accumulation is detected by the WTG 100.

At block 830, the field controller 520 determines whether and how to adjust the solar tracking setpoints from the power generation maximizing setpoints to reposition the collector face 340 to mitigate the risk of potential debris dislodged from the WTG 100 from damaging the solar cells 330. In some embodiments, when the field controller 520 determines that the range of motion for the PVGs 300 is insufficient or incapable of repositioning the collector face 340 to mitigate potential damage, the field controller 520 determines to leave the solar tracking setpoints as determined in block 810. In some embodiments, the field controller 520 sets the solar tracking setpoints to move the collector face 340 such that the solar cells 330 are pointed away from the WTG 100 or oblique to the expected path that potential debris may travel from the WTG 100 to avoid damage to the solar cells 330.

In various embodiments, the field controller 520 adjusts the setpoints for each PVG 300 in the associated field, while in other embodiments, the field controller 520 adjusts the setpoints for a subset of the PVGs 300 in the associated field. For example, in response to determining that a first PVG 300a is in the throw zone 610 of a WTG 100 and a second PVG 300b is not in the throw zone 610, a field controller 520 for the field including the first PVG 300a and the second PVG 300b can adjust the setpoints for the first PVG 300a and leave the second PVG 300b set to the original setpoints for tracking the Sun. In another example, in response to determining that a first PVG 300a is in a throw zone 610 of a first WTG 100a and a second PVG 300b is in the throw zone 610 for a second WTG 100b, a field controller 520 for the field including the first PVG 300a and the second PVG 300b can individually adjust the setpoints for the first PVG 300a the second PVG 300b to avoid damage from potential debris from the respective WTGs 100 whose throw zones 610 the individual PVGs 300 are in.

At block 840, the field controller 520 determines whether an airborne impactor event has been detected. An airborne impactor event includes weather events that produce airborne impactors 370 (e.g., hailstorms, sandstorms, tornados) as well as weather events that produce icing conditions on WTGs 100 (e.g., freezing rain, snow storms, freezing conditions in humid environments). In various embodiments, the field controller 520 determines that an airborne impactor event is occurring when various conditions conducive to, or indicative of, impactor formation are reported (e.g., via environmental sensors providing data related to humidity, temperature, precipitation, etc.; a weather forecast), ice detection sensors associated with a WTG 100 indicating the formation of ice on the WTG 100 (measuring the mass of the blades 108, frequency of rotation, generator performance), or actual impactors 370 are detected (e.g., via a hail sensor 540). Method 800 proceeds to block 850 in response to detecting an airborne impactor event, and may proceed to block 860 in response to not detecting an airborne impactor event.

At block 850, the field controller 520 determines whether and how to adjust the solar tracking setpoints from the power generation maximizing setpoints (from block 810) or the debris minimizing setpoints (from block 830) to reposition the collector face 340 to mitigate the risk of airborne impactors 370 from damaging the solar cells 330. In some embodiments, when the field controller 520 determines that the range of motion for the PVGs 300 is insufficient or incapable of repositioning the collector face 340 to mitigate potential damage, the field controller 520 determines to leave the solar tracking setpoints as determined in block 810 or block 830. In some embodiments, the field controller 520 sets the solar tracking setpoints to move the collector face 340 such that the solar cells 330 are pointed out of the expected trajectory 380 that detected airborne impactors 370 are traveling. In some embodiments, the collector face 340 is pointed out of the trajectory 380 by reorienting the collector face 340 leeward to the trajectory 380; placing the rear face 390 into the trajectory 380. In some embodiments, the collector face 340 is pointed out of the trajectory 380 by reorienting the collector face 340 to be oblique to the trajectory 380; leaving the collector face 340 potentially exposed to the airborne impactors 370, but reducing the potential force of impact from the airborne impactors 370 compared to leaving the collector face 340 perpendicular to the trajectory 380.

At block 860, the field controller 520 transmits the setpoints to the tracking motors 350 of the PVGs 300 in the associated field. On receipt of the setpoints, the tracking motors 350 adjust the position of the various components of the associated PVGs 300. In various embodiments, the setpoints are the solar tracking setpoints determined per block 810, while in other embodiments the determinations of a PVG 300 being in the throw zone 610 or a detected airborne impactor event cause the field controller 520 to adjust the setpoints of one or more PVGs 300 to new positions to mitigate the potential for impactors damaging the solar cells 330 of the one or more PVGs 300. Method 800 may then conclude.

Figure 9:
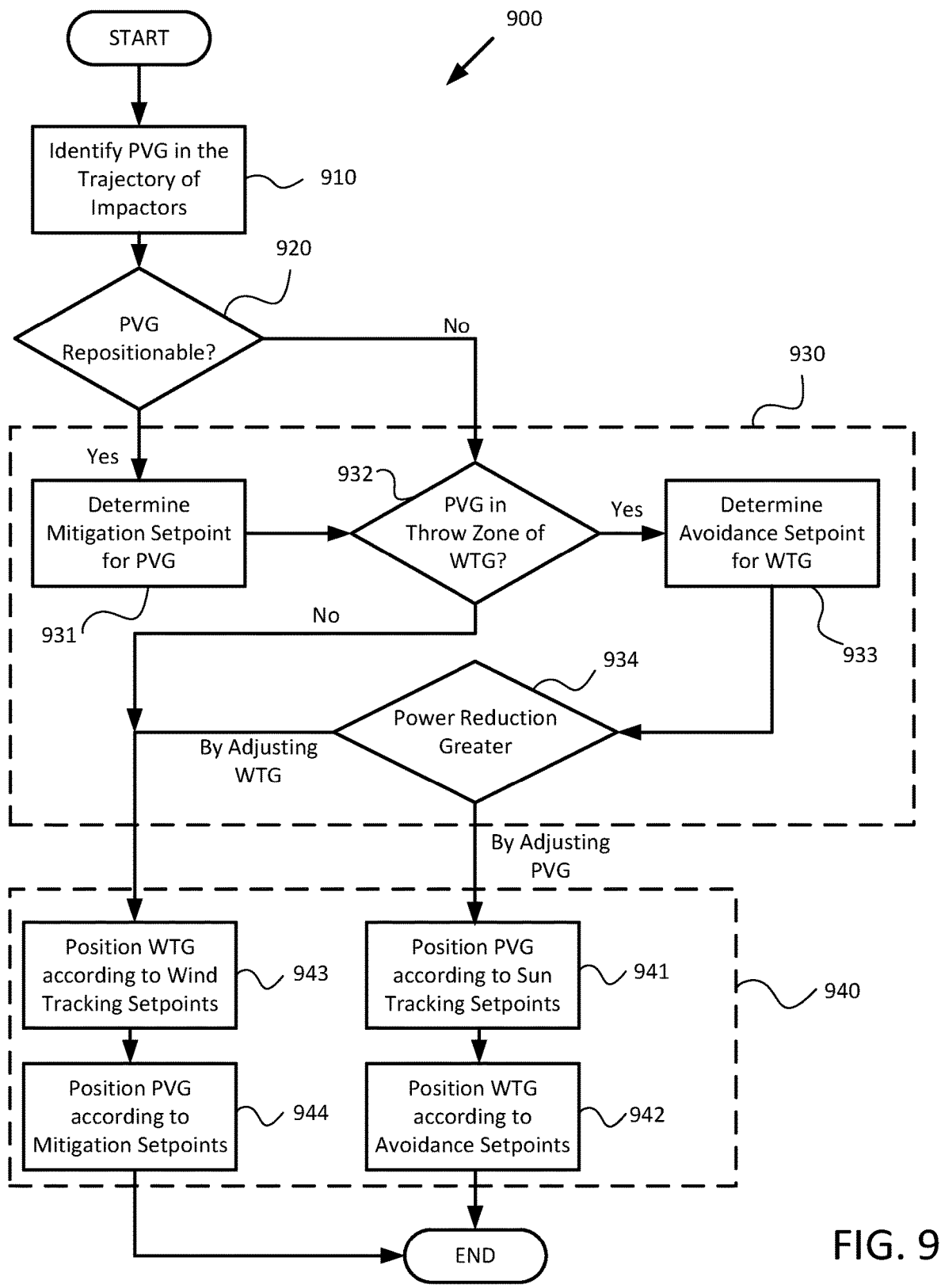
FIG. 9 is a flowchart of a method of optimizing photovoltaic setpoints and wind turbine setpoints for inclement weather events, according to one or more embodiments of the present invention.

FIG. 9 is a flowchart of a method 900 of optimizing photovoltaic setpoints and wind turbine setpoints for inclement weather events, according to embodiments of the present disclosure. Each WTG 100 and PVG 300 using setpoints adjusted according to method 900 begins with wind tracking setpoints and sun tracking setpoints (respectively) set to generate a maximum amount of power for the current conditions for the hybrid power plant 500. For example, a WTG 100 uses wind tracking setpoints set to position the blades 108 to generate up to the rated power for the WTG 100 based on the current wind speed and direction, and a PVG 300 uses sun tracking setpoints set to position the collector face 340 of the PVG 300 as perpendicular as possible to the Sun to collect as much sunlight as possible for a given position of the Sun in the sky.

At block 910, a controller unit 400 identifies a PVG 300 in the trajectory 380 of a potential or detected impactor 370. In one embodiment, the trajectory 380 is determined based on a throw zone 610 that overlays the PVG 300. In one embodiment, the trajectory 380 is based on a wind speed, wind direction, and size of airborne impactors 370 produced by a weather event (e.g., hailstorm, sandstorm, tornado, hurricane).

At block 920, the controller unit 400 determines whether the PVG 300 is repositionable such that the collector face 340 of the PVG 300 can be reoriented to move the collector face 340 to reduce an expected impact force of the airborne impactor 370 to the collector face. Depending on the degrees of freedom of movement for the PVG 300 and the trajectory 380 of potential or detected impactors 370, the PVG 300 may be unable to move the collector face 340 such that impact force can be reduced. For example, if the PVG 300 is has a fixed position, the controller unit 400 determines that the PVG 300 is not repositionable. In another example, if the PVG 300 is adjustable on one axis, the controller unit 400 determines that the PVG 300 is repositionable if the axis allows the PVG 300 to pivot in relation to the trajectory 380, and determines that the PVG 300 is not repositionable if the axis does not allow the PVG 300 to pivot in relation to the trajectory 380.

At block 930, the controller unit 400 determines an optimized setpoint for the PVG 300 that orients the collector face 340 of the PVG 300 such that an expected power generation of the PVG 300 is maximized when the collector face 340 is repositioned to reduce the expected force of the airborne impactor 370 below an impact threshold. When the controller unit 400 determines that the PVG 300 is repositionable at block 920, block 930 begins with sub-block 931, where the controller unit determines a mitigation setpoint for the PVG 300. Stated differently, of the mitigation setpoint indicates the position that the PVG 300 may be moved to, that allows the PVG 300 to generate the most power, but also ensures that the PVG 300 is simultaneously protected from impactors 370 striking the collector face 340 with potentially damaging force. For example, for two or more candidate mitigation setpoints that are determined to protect the collector face 340 from impacts above a given force, the controller unit 400 selects the one candidate at which the PVG 300 is calculated to produce the most power. In another example, for two or more candidate mitigation setpoints that are determined to produce the same power, the controller unit 400 selects the one candidate at which the PVG 300 is calculated to be subject to impacts at the lowest level of force.

When the controller unit 400 determines that the PVG 300 is repositionable at block 920 or after determining the mitigation setpoint per sub-block 931, at sub-block 932, the controller unit 400 determines whether the PVG 300 is in the trajectory 380 of impactors 370 due to being in a throw zone 610 of a WTG 100.

When it is determined that the PVG 300 is not in a throw zone 610, method 900 proceeds to sub-block 943 of block 940. When it is determined that the PVG 300 is in a throw zone 610, block 930 proceeds to sub-block 933, where the controller unit 400 determines an avoidance setpoint for the WTG 100 that moves the throw zone 610 to not overlay the PVG 300. In various embodiments, the avoidance setpoint moves the throw zone 610 by adjusting one or more of: a pitch angle of the WTG 100, a yaw angle of the WTG 100, a speed of rotation of the blades 108 of WTG 100, etc. In embodiments where moving the throw zone 610 to avoid overlaying the PVG 300 is not possible (e.g., fixed position WTGs 100, PVG 300 positioned in a consistent throw zone 610), the avoidance setpoint may remain the wind tracking setpoint or be set to another setpoint that minimizes the force or likelihood of dislodging debris from the WTG 100.

Method 900 proceeds from sub-block 933 to sub-block 934, where the controller unit 400 determines whether adjusting the setpoints of the WTG 100 or the setpoints of the PVG 300 results in a greater reduction in power production.

At block 940, the controller unit 400 signals the tracking motor 350 to position the Photovoltaic Generator 300 according to the optimized setpoint determined in block 930. In various embodiments, the controller unit 400 signals the WTG 100 and/or the PVG 300 to adjust the position of the various blades 108 or collector faces 340 to an optimized setpoint that protects the PVGs 300 from damage, while maximizing power point for a hybrid power plant 500.

Block 940 begins with sub-block 941 when the controller unit 400 determines that adjusting the PVG 300 would result in a greater reduction in power than adjusting the WTG 100 (per sub-block 934). At sub-block 941, the controller unit 400 determines that the optimized setpoint for the PVG 300 is the sun tracking setpoint, and positions the PVG 300 (e.g., via a signal to a tracking motor 350) accordingly. At sub-block 942, the controller unit 400 determines that the optimized setpoint for the WTG 100 is the avoidance setpoint, and positions (or controls the speed of) the nacelle 103 and/or blades 108 of the WTG 100 accordingly.

Block 940 begins with sub-block 943 when the controller unit 400 determines that adjusting the WTG 100 would result in a greater reduction in power than adjusting the PVG 300 (per sub-block 934) or determines that the PVG 300 is not in a throw zone 610 (per sub-block 932). At sub-block 943, the controller unit 400 determines that the optimized setpoint for the WTG 100 is the wind tracking setpoint, and positions the nacelle 104 and/or blades 108 of the WTG 100 accordingly. At sub-block 944, the controller unit 400 determines that the optimized setpoint for the PVG 300 is the mitigation setpoint, and positions the PVG 300 (e.g., via a signal to a tracking motor 350) accordingly.

Method 900 may then conclude.

Throughout the present disclosure, reference is made to embodiments presented. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments, and advantages described herein are merely illustrative and are not considered elements or limitations of the appended claims except where explicitly recited in a claim(s).

As will be appreciated by one skilled in the art, the embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

The present disclosure may be practiced as a system, a method, and/or a computer program product. The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present invention.

Embodiments of the present disclosure are described with reference to flowchart illustrations and/or block diagrams of methods, apparatuses (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

The flowchart illustrations and block diagrams in the Figures illustrate the architecture, functionality and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block(s) may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

The invention claimed is:

1. A hybrid power plant, comprising:
a field of photovoltaic generators;
at least one wind turbine generator co-located with the field of photovoltaic generators; and
a control system, comprising one or more controller units configured to implement an operation, comprising:
determining solar tracking setpoints for the field of photovoltaic generators, wherein the solar tracking setpoints orient a collector face for each photovoltaic generator sunward;
in response to determining based on data received from the at least one wind turbine generator that an airborne impactor event is occurring, adjusting the solar tracking setpoints to actively reposition the collector face at least partly out of a trajectory for airborne impactors; and
transmitting the solar tracking setpoints to tracking motors for the photovoltaic generators of the field.

2. The hybrid power plant of claim 1, wherein the solar tracking setpoints are adjusted to a predefined position.

3. The hybrid power plant of claim 1, wherein the airborne impactor event is determined based on data received from at least one hail detector mounted on a nacelle of the at least one wind turbine generator.

4. The hybrid power plant of claim 1, wherein the airborne impactor event is determined based on detection of conditions conducive to, or indicative of, ice formation on the at least one wind turbine generator.

5. The hybrid power plant of claim 4, wherein the operation further comprises:
identifying a given photovoltaic generator located along the trajectory for a potential airborne impactor from the at least one wind turbine generator.

6. The hybrid power plant of claim 5, wherein the operation further comprises:
determining if the given photovoltaic generator includes an associated collector face that is repositionable relative to the trajectory.

7. The hybrid power plant of claim 6, wherein the operation further comprises:
determining an optimized setpoint for the given photovoltaic generator that reorients the associated collector face to reduce an expected impact force of the potential airborne impactor to the associated collector face; and
positioning the given photovoltaic generator according to the optimized setpoint.

8. The hybrid power plant of claim 7, wherein the operation further comprises:
determining a mitigation setpoint for the given photovoltaic generator that orients a rear face of the given photovoltaic generator opposite to the collector face into the trajectory.

9. The hybrid power plant of claim 8, wherein the operation further comprises:
determining an avoidance setpoint for the at least one wind turbine generator that repositions a throw zone to not overlay the given photovoltaic generator.

10. The hybrid power plant of claim 9, wherein the operation further comprises:
determining whether a first reduction in power output from the given photovoltaic generator at the mitigation setpoint relative to a sun tracking setpoint is greater than a second reduction in power output from the at least one wind turbine generator at the avoidance setpoint relative to a wind tracking setpoint;
in response to determining that the first reduction in power is greater than the second reduction in power:
setting the optimized setpoint to the sun tracking setpoint; and
positioning the at least one wind turbine generator according to the avoidance setpoint.

11. The hybrid power plant of claim 7, wherein other photovoltaic generators in the field that are not located along the trajectory are not positioned according to the optimized setpoint.

12. The hybrid power plant of claim 7, wherein the optimized setpoint is determined based on a force and power generation curve such that an expected power generation of the field of photovoltaic generators is maximized when the collector faces are repositioned to reduce the expected impact force of the potential airborne impactor below an impact threshold.

13. The hybrid power plant of claim 1, wherein the airborne impactor event is determined by detecting whether one or more of the photovoltaic generators is at risk of being struck by debris dislodged from the at least one wind turbine generator.

* * * * *